US007703521B2

(12) United States Patent
Sullivan et al.

(10) Patent No.: US 7,703,521 B2
(45) Date of Patent: Apr. 27, 2010

(54) POLYMERIC MICROSPHERES AS DEGRADABLE FLUID LOSS ADDITIVES IN OILFIELD APPLICATIONS

(75) Inventors: Philip F. Sullivan, Bellaire, TX (US); Gary John Tustin, Sawston (GB); Don Williamson, Katy, TX (US); Hemant K. Ladva, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/353,810

(22) Filed: Jan. 14, 2009

(65) Prior Publication Data

US 2009/0205824 A1 Aug. 20, 2009

Related U.S. Application Data

(63) Continuation-in-part of application No. 12/033,630, filed on Feb. 19, 2008.

(51) Int. Cl.
*E21B 33/13* (2006.01)
*E21B 43/267* (2006.01)

(52) U.S. Cl. .................... 166/279; 166/280.2; 166/293; 166/300

(58) Field of Classification Search ....................... None
See application file for complete search history.

(56) References Cited

U.S. PATENT DOCUMENTS

| | | | |
|---|---|---|---|
| 3,937,283 | A | 2/1976 | Blauer et al. |
| 4,425,241 | A | 1/1984 | Swanson |
| 4,795,772 | A | 1/1989 | Hsieh |
| 5,110,486 | A | 5/1992 | Manalastas et al. |
| 5,190,374 | A | 3/1993 | Harms et al. |
| 5,382,411 | A | 1/1995 | Allen |
| 5,426,137 | A | 6/1995 | Allen |
| 5,892,147 | A | 4/1999 | Garnes et al. |
| 6,011,075 | A | 1/2000 | Parris et al. |
| 6,017,855 | A | 1/2000 | Dawson et al. |
| 6,169,058 | B1 | 1/2001 | Le et al. |
| 6,180,587 | B1 | 1/2001 | Fuller et al. |
| 6,383,990 | B1 | 5/2002 | Dawson et al. |
| 6,450,260 | B1 | 9/2002 | James et al. |
| 6,489,270 | B1 | 12/2002 | Vollmer et al. |
| 6,645,769 | B2 | 11/2003 | Tayebi et al. |
| 6,727,209 | B2 | 4/2004 | Pereira et al. |
| 6,733,769 | B1 | 5/2004 | Ryan et al. |
| 6,805,879 | B2 | 10/2004 | Jin et al. |
| 6,810,959 | B1 | 11/2004 | Qu et al. |
| 6,818,594 | B1 | 11/2004 | Freeman et al. |
| 6,838,418 | B2 | 1/2005 | Allan et al. |
| 6,843,841 | B2 | 1/2005 | Reddy et al. |
| 6,987,083 | B2 | 1/2006 | Phillippi et al. |
| 6,998,393 | B2 | 2/2006 | Jin et al. |
| 7,004,254 | B1 | 2/2006 | Chatterji et al. |
| 7,032,662 | B2 | 4/2006 | Malone et al. |
| 7,090,015 | B2 | 8/2006 | Todd |
| 7,117,942 | B2 | 10/2006 | Dalrymple et al. |
| 7,151,078 | B2 | 12/2006 | Zaroslov et al. |
| 7,195,065 | B2 | 3/2007 | Kelly et al. |
| 7,207,387 | B2 | 4/2007 | Eoff et al. |
| 7,220,713 | B2 | 5/2007 | Patel et al. |
| 7,270,184 | B2 | 9/2007 | Kotlar et al. |
| 7,287,587 | B2 | 10/2007 | Reddy et al. |
| 7,287,588 | B2 | 10/2007 | Zaroslov et al. |
| 7,290,615 | B2 | 11/2007 | Christanti et al. |
| 7,311,146 | B1 | 12/2007 | Hanes, Jr. et al. |
| 7,316,275 | B2 | 1/2008 | Wang et al. |
| 7,322,414 | B2 | 1/2008 | Reddy et al. |
| 7,347,260 | B2 | 3/2008 | Ferguson et al. |
| 7,351,681 | B2 | 4/2008 | Reddy et al. |
| 2002/0055461 | A1 | 5/2002 | Jin et al. |
| 2004/0209780 | A1 | 10/2004 | Harris et al. |
| 2004/0256106 | A1 | 12/2004 | Phillippi et al. |

(Continued)

FOREIGN PATENT DOCUMENTS

EP 0 358 385 A2 3/1990

(Continued)

OTHER PUBLICATIONS

Closs, C.B. et al. Phase Separation and Rheology of Aqueous Starch/Galactomannan Systems. Carbohydrate Polymers, vol. 39, pp. 67-77. 1999.

(Continued)

*Primary Examiner*—Zakiya W. Bates
(74) *Attorney, Agent, or Firm*—Rachel Greene; David Cate; Robin Nava

(57) ABSTRACT

Methods and apparatus for forming a fluid for use within in a subterranean formation including crosslinking a polymer along the surface of microspheres in a water-in-water emulsion and introducing the microspheres into the subterranean formation. Methods and apparatus for forming a fluid for use within in a subterranean formation including crosslinking a polymer along the surface of microspheres in a water in water emulsion, isolating the microspheres from the emulsion, and introducing the microspheres into the subterranean formation. Methods and apparatus for forming a fluid to treat a subterranean formation including introducing a crosslinkable polymer, partitioning agent, and crosslinker into a solvent, crosslinking the crosslinkable polymer, isolating beads of the crosslinkable polymer from the partitioning agent, introducing the beads into a fluid for treating a subterranean formation.

27 Claims, 5 Drawing Sheets

U.S. PATENT DOCUMENTS

| | | | |
|---|---|---|---|
| 2005/0155796 | A1 | 7/2005 | Eoff et al. |
| 2005/0199396 | A1 | 9/2005 | Sierra et al. |
| 2005/0272612 | A1 | 12/2005 | Dawson et al. |
| 2006/0234874 | A1 | 10/2006 | Eoff et al. |
| 2006/0258542 | A1 | 11/2006 | Segura |
| 2007/0114035 | A1 | 5/2007 | Parris et al. |
| 2008/0096774 | A1 | 4/2008 | Tabary et al. |
| 2008/0121395 | A1 | 5/2008 | Reddy et al. |
| 2009/0023614 | A1 | 1/2009 | Sullivan et al. |
| 2009/0023615 | A1 | 1/2009 | Chen et al. |
| 2009/0176667 | A1 * | 7/2009 | Nguyen ...................... 507/204 |

FOREIGN PATENT DOCUMENTS

| | | | |
|---|---|---|---|
| EP | 0 846 747 | A1 | 6/1998 |
| EP | 0 583 814 | B1 | 10/1998 |
| GB | 2 172 008 | A | 9/1986 |
| JP | 61225275 | A | 10/1986 |
| WO | 03106809 | A1 | 12/2003 |
| WO | 2006024795 | A1 | 8/2007 |
| WO | 2007085983 | | 8/2007 |

OTHER PUBLICATIONS

Tolstoguzov, V. Phase Behavior in Mixed Polysaccharide Systems. Chapter 17 in Food Polysaccharides and Their Applications, edited by A.M. Stephen, G.O. Phillips and P.A. Williams. 2006.

* cited by examiner

Fluid loss /g
70
60
50
40
30
20
10
0
0
20
40
Root time /sec^1/2
79 C
Shut in
Baseline
1 wt% PGA
1 wt% Guar coated PGA Baseline
1 wt% PGA
1 wt% Guar coated PGA
Temperature (C)
viscosity (cP)
Temperature (C)
time (minutes)
0
200
400
600
800
1000
1200
0
10
20
30
40
50
60
70
80
90
0
20
40
60
80
100
120
140

POLYMERIC MICROSPHERES AS DEGRADABLE FLUID LOSS ADDITIVES IN OILFIELD APPLICATIONS

CROSS REFERENCE TO RELATED APPLICATIONS

This application claims priority to and the benefit as a continuation in part application of U.S. patent application Ser. No. 12/033,630, filed Feb. 19, 2008, which is incorporated by reference herein in its entirety.

FIELD OF THE INVENTION

The invention relates to fluid loss additives for use in oilfield applications for subterranean formations. More particularly, the invention relates to filter cakes, particularly to easily destroyable filter cakes formed from polymeric microspheres.

BACKGROUND OF THE INVENTION

The statements in this section merely provide background information related to the present disclosure and may not constitute prior art.

Fractures in oilfield reservoirs typically have the highest flow capacity of any portion of the reservoir formation. In natural fractures, the high flow capacity results when the fracture is open and the closure stress is low. In artificially created fractures, the high flow capacity results from the fracture being propped open with a permeable bed of material or etched along the fracture face with acid or other material that has dissolved part of the formation. Normally, such high flow capacity is desirable.

However, in the life of an oil well, there are various times in which it is desirable to reduce the flow capacity by plugging or partially plugging the fracture. Typically, this is when the fracture is producing unwanted fluids such as water or gas, when there is a non-uniformity of injected fluid, or when expensive materials are being injected into non-producing areas of the formation. Expensive material loss is a particularly critical reason because the flow of expensive fluid into an already open fracture wastes the material, along with manpower, etc., to produce or increase a fracture where not needed, and in many cases, it results in the growth of a fracture into a region from which undesirable fluid, such as water, is produced.

Compositions for plugging fractures to reduce flow of fluids and fluid loss have typically included clays or cement systems. The disadvantages of cement systems include setting and bridging prematurely. The hydrating clays are complex to pump, require expensive well work, must hydrate fully along the fracture, and may also bridge prematurely. Polymer systems have also been attempted for plugging fractures, but often fail due to lack of flow resistance. Further, use of such systems is expensive because of the requirements for large volumes of materials. Transportation considerations may also add to the cost of the systems.

A need therefore remains for an inexpensive and reliable drilling or well plugging material and for methods of use during well treatments such as drilling, well completion, stimulation, and fluids production.

SUMMARY

Embodiments provide methods and apparatus for forming a fluid for use within in a subterranean formation including crosslinking a polymer along the surface of microspheres in a water-in-water emulsion and introducing the microspheres into the subterranean formation. Embodiments also provide methods and apparatus for forming a fluid for use within in a subterranean formation including crosslinking a polymer along the surface of microspheres in a water in water emulsion, isolating the microspheres from the emulsion, and introducing the microspheres into the subterranean formation. Embodiments provide methods and apparatus for forming a fluid to treat a subterranean formation including introducing a crosslinkable polymer, partitioning agent, and crosslinker into a solvent, crosslinking the crosslinkable polymer, isolating beads of the crosslinkable polymer from the partitioning agent, introducing the beads into a fluid for treating a subterranean formation.

DETAILED DESCRIPTION OF THE INVENTION

Figure 1:
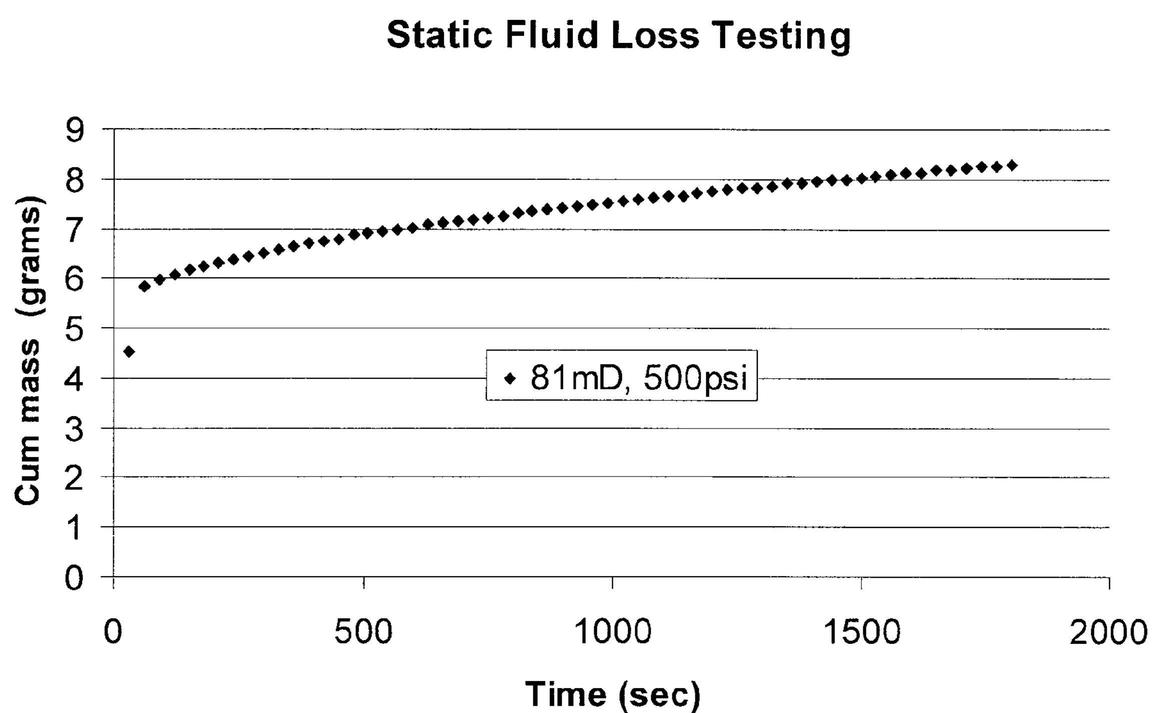
FIG. 1 is a plot of cumulative mass as a function of time to demonstrate fluid loss measurement for crosslinked guar microbeads of an embodiment of the invention.

The procedural techniques for pumping fluids down a wellbore to fracture, drill, complete, or stimulate a subterranean formation are well known. The person that designs such treatments is the person of ordinary skill to whom this disclosure is directed. That person has available many useful tools to help design and implement the treatments, including computer programs for simulation of treatments.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific numbers, it is to be understood that inventors appreciate and understand that any and all data points within the range are to be considered to have been specified, and that inventors have disclosed and enabled the entire range and all points within the range. All percents, parts and ratios herein are by weight unless specifically noted otherwise. In this document, the terms "microsphere," "microbead," and "microparticle" are used interchangeably for microscopic particles, which may contain an interior region comprising a solid, polymer, liquid, or other material.

Two polymers, upon dissolving in a common solvent, may spontaneously separate into two phases that are each enriched in one of the polymers. When two or more different water soluble polymers are dissolved together in an aqueous medium, it is sometimes observed that the system phase separates into distinct regions or phases. The presence of these regions or phases may also be referred to as a water-in-water emulsion. This separation happens when two polymers at high concentration are each water-soluble but thermodynamically incompatible with each other, such as polyethylene glycol (PEG) and dextran.

The morphology of the de-mixed "emulsion" is related to the relative concentration of the two species. Systems formed with a 50/50 phase volume condition often give rise to bi-continuous phase structures with neither phase being internal or external. Biphasic mixtures formulated away from this bi-continuous condition comprise droplets of one polymer-rich phase dispersed in an external phase enriched with the other polymer. These droplets may be of such a nature that they resemble microspheres or other shapes of consistent composition. Throughout this application these small (approximately 100 micron diameter) globs of material are referred to as microbeads. Often, a rheological polymer, also known as a crosslinkable polymer, will comprise the majority of an isolated, droplet phase and a partitioning agent will comprise a continuous phase.

The phase behavior and composition of a mixed system depends on the relative polymer concentrations, the interactive associations between the polymer types, and the affinity of each polymer for the common solvent. Temperature, salinity, pH, and the presence of other molecules in solution can all influence the system polymer-polymer and polymer-solvent interactions. Density differences between phases will occasionally give rise to bulk separation if left undisturbed over time.

This phase separation that arises when incompatible polymers are introduced into a system has been studied in other industries. In the food industry, two-phase aqueous fluids are used to create polymer solutions that mimic the properties of fat globules. In the biomedical industry, such systems are exploited as separation media for proteins, enzymes, and other macromolecules that preferentially partition to one polymer phase in the mixture. For example, drug encapsulation and surface modifiers may be selected that comprise water water emulsions because the nontoxic materials are charged and have moderate interfacial tension between two phases.

The oilfield service industry may benefit from biphasic polymer systems for a myriad of applications. Microspheres may be formed within the aqueous two-phase systems and used for a variety of downhole applications including fluid loss additives, film formers, bridging agents, and creation of downhole structures. Embodiments of the invention may form beads when a multiphase system features isolated phases of a specific size that are crosslinked. Once the beads are formed, they may be incorporated into a well-treatment fluid in different ways. In one embodiment the slurry of beads formed in the biphasic fluid may be directly used as a well treating fluid. Once pumped downhole, the beads may be useful to form a film, a plug or a sealant layer downhole either in the earth or in the wellbore. This process of creating and using the beads may be either a batch process or a continuous "on-the-fly" process. The bead slurry may be pumped alone into the well or it may be mixed into another stream to make a well treatment fluid that now incorporates the beads.

Alternatively, once the beads are formed they may be isolated, transported, and introduced into a well services fluid using a process that does not require time consuming hydration and polymer crosslinking fluid processing steps. Isolating microspheres of polymer material yields a material that may be shipped with lower transportation costs and that may be tailored with specific polymer properties. Also, once the polymer is crosslinked within and isolated from an aqueous two-phase system, the risk that fish-eyes will form when the polymer is used in a water or oil based slurry at the wellsite is minimized.

The term water-in-water emulsion as used herein is used to encompass mixtures comprising normally water-soluble polymers in the dispersed phase regardless of whether the dispersed phase is a liquid droplet of low or high viscosity polymer solution, or a paste-like or water wet polymer globule containing solid polymer particles, i.e. the water-in-water emulsion is applicable to both liquid-liquid mixtures and liquid-solid slurries comprising water-soluble polymers. Such two-phase systems are variously referred to in the literature as water-in-water emulsions, biphasic systems, aqueous two phase systems (ATPS), gelling polymer fluid, crosslinked microbeads, aqueous/aqueous emulsion system, aqueous biphasic system, low viscosity polymer fluid, filled system, solvent-in-solvent emulsion, or heterogeneous mixture (with a polymer rich phase and a partitioning agent rich phase). Although they may be referred to as emulsions they do not necessarily contain either oil or surfactant.

Preparing and Using the Microbeads

In an embodiment, the partitioning agent-rich phase can be continuous and the crosslinkable-polymer-rich phase can be finely dispersed therein. In an embodiment, the partitioning agent can comprise a polymer soluble in the liquid media and have a solubility different than the crosslinkable polymer. In an embodiment, concentrated solutions of the crosslinkable polymer and of the partitioning agent in a liquid medium are immiscible with each other and both aqueous.

The crosslinkable polymer and partitioning may be agitated. Once phase separated in solution, the concentrated droplets of the crosslinkable polymer can be selectively crosslinked to create small beads of crosslinked polymer. This crosslinking occurs in a way that is similar to polymer crosslinking in an oil field services fluid when a continuous or not multiphase system is selected. A crosslinker such as borate, zirconate, or titanate is introduced into the system. The pH of an embodiment should be selected based, in part, on the crosslinker used. For embodiments using borate or zirconate based crosslinkers, a pH of about 8 or more may be selected. For example, if a titinate crosslinker is used, the pH is controlled to a pH of lower than about 5. The crosslinkable polymer then crosslinks. The crosslinking is confirmed by a visual test, a non crosslinked polymer bead would not viscosify and would not be visual as a microbead.

Crosslinked microbeads created from an aqueous biphasic process can be dried out and then used as dehydrated crosslinked polymer beads. These dried beads can be useful as degradable fluid loss additives. The beads can also be useful as fluid loss additives when used in conjunction with other degradable particulate additives.

To isolate the beads from the two phase system described above, initially agitation must stop. In a lab scale process, filter paper may be used to filter the beads from the rest of the fluid. Larger scale processes may use centrifugation, static settling over time, or spray drying to isolate the beads. It is possible that the isolated fluid may be recycled to conserve the need for additional partitioning agent as additional microbeads are manufactured, for example, when using a repeating batch process.

For example, in a lab scale embodiment, dry guar is dissolved and hydrated for 30 minutes in a blender. The guar is introduced in a concentration of 0.2 to 2.0 weight percent. The resulting viscous fluid is agitated continuously, while 4.0 weight percent PEG 8000 molecular weight is introduced to the fluid. The PEG readily phase separates. The guar concentrates into small domains or microspheres within the fluid. The ongoing agitation prevents gravity based settling or agglomeration.

After the fluid has separated into two phases, a pH adjuster and a crosslinker, such as borate crosslinker, may be introduced into the system. For example, boric acid may be introduced to dissolve in about a minute, then the pH adjuster may be introduced to trigger the borate crosslinking of the guar domains. This crosslinking results in crosslinked guar microbeads that may then be isolated from the two phase system.

Photographs of systems produced using these methods show beads that are nearly transparent with a mean diameter of approximately 100 microns. The crosslinked beads are not spherical, but appear to take on the shape of the guar droplet under shear when the crosslinker is activated.

To dry the beads in a lab scale environment, they may be spread across a tray and left in a warm, dry environment such as an oven set at about 49° C. In a larger scale enterprise, they may undergo a standard baking or evaporation process.

Once the beads are isolated and dried, they may undergo additional treatment, such as grinding to form smaller particles or encapsulated or coated for tailoring for a variety of purposes. A mortar and pestle may be used to grind the beads in a lab scale process.

An embodiment of this system may include that the beads can be sprayed or coated in some way after creation to increase water-resistance or to add some functionality. For example, an oil spray can be applied to the surface of the beads to make them more water resistant. The surface of the beads may be more hydrophobic.

Another embodiment may take advantage of the fact that the beads may be soaked in a chemical or formed encompassing material that will then be released to the fluid when the beads are immersed. The material may be present throughout both of the phases of the water-in-water emulsion or the material may be present in a higher concentration in one of the phases of the emulsion. At least a portion of the microspheres may include a region which may contain one or more chemical agents to be released, including breakers for the filter cake, cleanup agents, and the like. The chemical agent or material that may be present in the microbead includes solid acid particles, pH buffer, crosslinker, scale inhibitors, corrosion inhibitors, breakers, surfactants, clean up additives, or other materials.

If it is desired to have such particles in the beads, the particles may be introduced into the initial fluid before the second (incompatible) polymer is added to the fluid, that is, before phase separation occurs. As phase separation occurs, the particles appear to predominantly remain in the higher viscosity microbead forming polymer phase. The higher viscosity and/or the chemical attraction between the particles and the polymer phase are presumed to encourage this separation.

The microspheres in the fluid of the invention may, when included at higher concentrations, form a filter cake in the formation which is easily destroyable when no longer needed. Specific chemical agents which may be contained in the microspheres include acids such as organic acids or mineral acids, so long as such acids will not dissolve the microspheres until a delayed period after injection to allow the time desired for the formation treatment. Useful organic acids include polyglycolic acid, polylactic acid, and the like.

When the compositions of the invention are used in the subterranean formation to provide a plug or filter cake over a part of the formation, chemical agents should be chosen for the microspheres such that the filter cake will remain in the formation for the desired length of time. Change in pH or other chemical change brought about by the release of a chemical agent, or simply by the passage of time in contact with the formation will begin to dissolve the microspheres. Dissolution of a substantial amount of microspheres will destroy the filter cake, thus releasing more chemical agents, when present to clean the cake out of the formation after the fluid diversion or other procedure is complete.

In one embodiment, the fluid composition of the invention further comprises a gellable polymer, which gels by means of crosslinking. Dissolution of the microspheres renders the crosslinking agent used during the formation of the microspheres available for crosslinking the gellable polymer, providing a delayed gelled fluid. Extra crosslinker may also be present in the fluid or embedded within the microbead. Additional polymer may also be present in the fluid.

Microspheres of the invention, once formed, may be added to various fluid compositions, to form treatment fluids for subterranean formations. Such fluids may be aqueous or non-aqueous, and should be selected based on the treatment desired and on the specific polymer(s) used in formation of the microspheres. The microspheres retain their bead-like crosslinked nature for at least 2 hours at a pH of about 8 or higher for microspheres formed using a borate crosslinker. This may be verified by visual tests. Upon exposure to fluid with a pH of about 6 or less, the crosslinker is degradable for microspheres formed using a borate crosslinker. Well treatment fluid may be prepared by any one of the embodiments of the methods described above, including any combination or permutation of the individual method steps.

Ratio of Components

The ratio of components selected within the fluid or concentrate may be selected based on a variety of factors. In an embodiment, the mixing step comprises a weight ratio of crosslinkable polymer to partitioning agent from 1:4 to 5:1. Another embodiment of the present invention provides the polymer concentrate prepared by a method described above. In an embodiment, the heterogeneous mixture can include from about 0.1 to about 20 percent of the crosslinkable polymer, by weight of the water in the mixture. In another embodiment, the mixture may comprise about 0.01 to about 99.0 percent by weight crosslinkable polymer when the crosslinkable polymer is present in microbead form and/or in agglomerated microbead form. In some embodiments, the concentration of the beads is about 0.01 to about 50.0 weight percent. In some additional embodiments the concentration of the beads is about 0.01 to about 10.0 weight percent.

In applications wherein the beads are not isolated, a slurry containing the crosslinkable polymer, partitioning agent and optionally other materials may be introduced into a well treatment fluid in a concentration of about 0.01 to about 99.0 weight percent. In some embodiments, the concentration of the slurry may be introduced into a well treatment fluid in a concentration of about 0.01 to about 50.0 weight percent. In some embodiments, the concentration of the slurry may be introduced into a well treatment fluid in a concentration of about 0.01 to about 10.0 weight percent.

In an embodiment, the heterogeneous polymer concentrate can have any suitable weight ratio of crosslinakable polymer to partitioning agent that provides a heterogeneous mixture, i.e. a binary liquid mixture or a solid-liquid slurry. If the ratio of polymer: partitioning agent is too high, the mixture becomes too thick to pour or pump, or may even form a paste; if too low, the partitioning agent upon dilution may have an adverse impact on the polymer solution or well treatment fluid.

Partitioning Agent

The microspheres useful in methods of embodiments of the invention may be formed of crosslinkable polymers such as polysaccharides, guars, alginates, and the like. The microspheres are formed by the presence of a partitioning agent.

In an embodiment, the present invention uses a partitioning agent that severely limits the solubility of a crosslinkable agent, such as a polymer. As a result, the mixture forms a water-in-water emulsion where a concentrated crosslinkable agent is concentrated in the dispersed phase, as a viscous aqueous solution or as water-wet, hydrated, or partially hydrated particles, and the partitioning agent is concentrated in the continuous phase. One exemplary, non-limiting system comprises guar as the crosslinkable agent and polyethylene glycol (PEG) as the portioning agent.

It is believed that the mixture has a low viscosity due to the continuous phase having a very low concentration of the crosslinkable polymer, but the invention is not limited by this theory and is generally applicable to any polymer-concentrated, biphasic mixtures in a mutual solvent or solvent system.

The selection of the partitioning agent depends on the polymer that is to be concentrated in the heterogeneous mixture, as well as the solvent system, e.g. aqueous, non-aqueous, oil, etc. In one embodiment in general, the partitioning agent is soluble in the solvent medium, but has dissimilar thermodynamic properties such that a solution thereof is immiscible with a solution of the polymer at concentrations above a binodal curve for the system, or such that a solid phase of the polymer will not dissolve in a solution of the partitioning agent at the concentration in the system. For example, where the polymer is a high molecular weight hydrophilic polymer, the partitioning agent can be a low molecular weight hydrophobic polymer. For guar and polymers thermodynamically similar to guar, the partitioning agent in an embodiment is a polyoxyalkylene, wherein the oxyalkylene units comprise from one to four carbon atoms, such as, for example a polymer of ethylene glycol, propylene glycol or oxide, or a combination thereof, having a weight average molecular weight from 1000 to 25,000. As used herein, "polyoxyalkylene" and refers to homopolymers and copolymers comprising at least one block, segment, branch or region composed of oxyalkylene repeat units, e.g. polyethylene glycol. Polyethylene glycol (PEG) having a molecular weight between 2000 and 10,000 is widely commercially available. Other embodiments comprise methoxy-PEG (mPEG); poloxamers available as PEG-polypropylene oxide (PPO) triblock copolymers under the trade designation PLURONICS™; alkylated and hydroxyalkylated PEG available under the trade designation BRIJ™, e.g. BRIJ 38™; and the like.

Other examples of partitioning agents can include polyvinyl pyrrolidone, vinyl pyrrolidine-vinyl acetate copolymers, and hydroxyalkylated or carboxyalkylated cellulose, especially low molecular weight hydroxyalkylated cellulose such as hydroxypropyl cellulose having a molecular weight of about 10,000.

Another embodiment of partitioning agents comprises the class of water soluble chemicals known as non-ionic surfactants. These surfactants comprise hydrophilic and hydrophobic groups, that is, they are amphiphilic, but are electrophilically neutral, i.e. uncharged. Nonionic surfactants can be selected from the group consisting of alkyl polyethylene oxides (such as BRIJ™ surfactants, for example), polyethylene oxide-polypropylene oxide copolymers (such as poloxamers or poloxamines, for example), alkyl-, hydroxyalkyl- and alkoxyalkyl polyglucosides (such as octyl or decyl glucosides or maltosides), fatty alcohols, fatty acid amides, and the like.

Crosslinkable Polymer

As used herein, when a polymer is referred to as comprising a monomer or comonomer, the monomer is present in the polymer in the polymerized form of the monomer or in the derivative form of the monomer. However, for ease of reference the phrase comprising the (respective) monomer or the like may be used as shorthand.

Some examples of polymers useful in the invention include polymers that are either crosslinked or linear, or any combination thereof. Polymers include natural polymers, derivatives of natural polymers, synthetic polymers, biopolymers, and the like, or any mixtures thereof.

Useful gellable polymers include but are not limited to polymers that are either three dimensional or linear, or any combination thereof. Polymers include natural polymers, derivatives of natural polymers, synthetic polymers, biopolymers, and the like, or any mixtures thereof. Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used in either crosslinked form, or without crosslinker in linear form. Xanthan, diutan, and scleroglucan, three biopolymers, have been shown to be useful as well. Synthetic polymers such as, but not limited to, polyacrylamide, polyvinyl alcohol, polyethylene glycol, polypropylene glycol, and polyacrylate polymers, and the like, as well as copolymers thereof, are also useful. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups.

In some cases, the polymer, or polymers, include a linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$-$C_4$, $C_2/C_3$, $C_3/C_4$, or $C_2/C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{24}$-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8th Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans comprise a polymannose backbone attached to galactose branches that are present at an average ratio of from 1:1 to 1:5 galactose branches: mannose residues. Preferred galactomannans comprise a 1→4-linked β-D-mannopyranose backbone that is 16-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments of the present invention may be described or exemplified with reference to guar, such as by reference to hydroxy-$C_1$-$C_4$-alkyl guars, such descriptions apply equally to other galactomannans, as well.

In embodiments, the crosslinkable polymer can be a polysaccharide; the partitioning agent a polyalkylene oxide. In a particular embodiment, the heterogeneous mixture can comprise polyethylene glycol and one or more of guar, guar derivative, cellulose, cellulose derivative, heteropolysaccharide, heteropolysaccharide derivative, or polyacrylamide in an aqueous medium.

Additional Fluid Components

In an embodiment, the liquid media can be aqueous and the partitioning agent can include nonionic surfactant. Additionally or alternatively, the method can further comprise the step of dispersing a gas phase in the well treatment fluid to form an energized fluid or foam.

The water-in-water emulsion may further include other additives such as dispersing aids, surfactants, pH adjusting compounds, buffers, antioxidants, colorants, biocides, which do not materially change the miscibility or solubility of the heterogeneous phases, or interfere with the desirable characteristics of the well treatment fluid. The polymer concentrate can include any additive that is to be introduced into the well treatment fluid separately, provided that it is essentially inert in the concentrate. In one embodiment, at least one other well treatment fluid additive is present in the polymer concentrate, such as, for example, proppants, fibers, crosslinkers, breakers, breaker aids, friction reducers, surfactants, clay stabilizers, buffers, and the like. The other additive can also be concentrated in the polymer concentrate so that the additive does not need to be added to the well treatment fluid separately, or can be added in a lesser amount. This can be advantageous where the other additive is usually added proportionally with respect to the polymer. Also, the activity of an additive(s) can be delayed, in one embodiment, and the delay can at least in part be facilitated where the additive is preferentially concentrated in the partitioning agent-rich phase or otherwise reactively separated from the polymer.

Some fluid compositions useful in some embodiments of the invention may also include a gas component, produced from any suitable gas that forms an energized fluid or foam when introduced into an aqueous medium. See, for example, U.S. Pat. No. 3,937,283 (Blauer, et al.) incorporated herein by reference. Preferably, the gas component comprises a gas selected from the group consisting of nitrogen, air, argon, carbon dioxide, and any mixtures thereof. More preferably the gas component comprises nitrogen or carbon dioxide, in any quality readily available. The gas component may assist in the fracturing and acidizing operation, as well as the well clean-up process.

The fluid in one embodiment may contain from about 10% to about 90% volume gas component based upon total fluid volume percent, preferably from about 20% to about 80% volume gas component based upon total fluid volume percent, and more preferably from about 30% to about 70% volume gas component based upon total fluid volume percent. In one embodiment, the fluid is a high-quality foam comprising 90 volume percent or greater gas phase. In one embodiment, the partitioning agent used in the polymer delivery system can be selected to enhance the characteristics of the energized fluid or foam, such as gas phase stability or viscosity, for example, where the partitioning agent is a surfactant such as a nonionic surfactant, especially the alkoxylated (e.g., ethoxylated) surfactants available under the BRIJ™ designation.

In some embodiments, the fluids used may further include a crosslinker. Crosslinking consists of the attachment of two polymeric chains through the chemical association of such chains to a common element or chemical group. Suitable crosslinkers may comprise a chemical compound containing a polyvalent ion such as, but not necessarily limited to, boron or a metal such as chromium, iron, aluminum, titanium, antimony and zirconium, or mixtures of polyvalent ions. The crosslinker can be delayed, in one embodiment, and the delay can at least in part be facilitated where the crosslinker or activator is concentrated or otherwise reactively separated in the partitioning agent-rich phase. Also, adding crosslinkers to the fluid may further augment the viscosity of the fluid.

Apparatus

A means of mixing a two-phase concentrate and selectively crosslinking one phase to make microbeads includes a continuous stirred tank reactor or a batch vessel that is configured to provide a fluid with a pH of about 8 or higher if a borate crosslinker is selected or other pH regime that is tailored for alternative crosslinker. The crosslinkable polymer, upon phase separation and most likely upon crosslinking, may be filtered from the solution and optionally dried using standard filter and drying equipment. In some embodiments, a continuous mix (on-the-fly) process may be selected and equipment may be sized and scaled accordingly.

The isolated and possibly dried beads may be transported at relatively low cost as dramatically less solvent is required to encompass the polymer. Upon arrival at the desired location, the beads may be quickly introduced to a well treatment fluid without requiring a substantial time for crosslinking as the beads are crosslinked before they are isolated. The fluid may contain additional polymer that is similar to the crosslinked polymer or polymer with an alternative identity. Further, the beads may retain their structure upon exposure to additional fluid that is at or above a pH of 8 for 72 hours or more. The beads may become deformable at a pH at or below 6.

In a fracturing treatment, fluids of the invention may be used in the pad treatment, the proppant stage, or both. The components of the liquid phase are preferably mixed on the surface. Alternatively, a the fluid may be prepared on the surface and pumped down tubing while the gas component could be pumped down the annular to mix down hole, or vice versa.

Yet another embodiment of the invention includes cleanup method. The term “cleanup” or “fracture cleanup” refers to the process of removing the fracture fluid (without the proppant) from the fracture and wellbore after the fracturing process has been completed. Techniques for promoting fracture cleanup traditionally involve reducing the viscosity of the fracture fluid as much as practical so that it will more readily flow back toward the wellbore. While breakers are typically used in cleanup, the fluids of the invention may be effective for use in cleanup operations, with or without a breaker.

In another embodiment, the invention relates to gravel packing a wellbore. A gravel packing fluid, it preferably comprises gravel or sand and other optional additives such as filter cake clean up reagents such as chelating agents referred to above or acids (e.g. hydrochloric, hydrofluoric, formic, acetic, citric acid) corrosion inhibitors, scale inhibitors, biocides, leak-off control agents, among others. For this application, suitable gravel or sand is typically having a mesh size between 8 and 70 U.S. Standard Sieve Series mesh.

The procedural techniques for pumping fracture stimulation fluids down a wellbore to fracture a subterranean formation are well known. The person that designs such fracturing treatments is the person of ordinary skill to whom this disclosure is directed. That person has available many useful tools to help design and implement the fracturing treatments, one of which is a computer program commonly referred to as a fracture simulation model (also known as fracture models, fracture simulators, and fracture placement models). Most if not all commercial service companies that provide fracturing services to the oilfield have one or more fracture simulation models that their treatment designers use. One commercial fracture simulation model that is widely used by several service companies is known as FRACCADE™. This commercial computer program is a fracture design, prediction, and treatment-monitoring program designed by Schlumberger, Ltd., of Sugar Land, Tex. All of the various fracture simulation models use information available to the treatment designer concerning the formation to be treated and the various treatment fluids (and additives) in the calculations, and the program output is a pumping schedule that is used to pump the fracture stimulation fluids into the wellbore. The text “Reservoir Stimulation,” Third Edition, Edited by Michael J. Economides and Kenneth G. Nolte, Published by John Wiley & Sons, (2000), is a reference book for fracturing and other well treatments; it discusses fracture simulation models in Chapter 5 (page 5-28) and the Appendix for Chapter 5 (page A-15)), which are incorporated herein by reference.

Additional Considerations

The fluids of some embodiments of the invention may include an electrolyte which may be an organic acid, organic acid salt, organic salt, or inorganic salt. Mixtures of the above members are specifically contemplated as falling within the scope of the invention. This member will typically be present in a minor amount (e.g. less than about 30% by weight of the liquid phase). The organic acid is typically a sulfonic acid or a carboxylic acid, and the anionic counter-ion of the organic acid salts is typically a sulfonate or a carboxylate. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred organic acids are formic acid, citric acid, 5-hydroxy-1-napthoic acid, 6-hydroxy-1-napthoic acid, 7-hydroxy-1-napthoic acid, 1-hydroxy-2-naphthoic acid, 3-hydroxy-2-naphthoic acid, 5-hydroxy-2-naphthoic acid, 7-hydroxy-2-napthoic acid, 1,3-dihydroxy-2-naphthoic acid, and 3,4-dichlorobenzoic acid.

The inorganic salts that are particularly suitable include, but are not limited to, water-soluble potassium, sodium, and ammonium salts, such as potassium chloride and ammonium chloride. Additionally, magnesium chloride, calcium chloride, calcium bromide, zinc halide, sodium carbonate, and sodium bicarbonate salts may also be used. Any mixtures of the inorganic salts may be used as well. The inorganic salts may aid in the development of increased viscosity that is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. In some embodiments of the invention, the electrolyte is an organic salt such as tetramethyl ammonium chloride, or inorganic salt such as potassium chloride. The electrolyte is preferably used in an amount of from about 0.01 wt % to about 12.0 wt % of the total liquid phase weight, and more preferably from about 0.1 wt % to about 8.0 wt % of the total liquid phase weight.

Fluids used in some embodiments of the invention may also comprise an organoamino compound. Examples of suitable organoamino compounds include, but are not necessarily limited to, tetraethylenepentamine, triethylenetetramine, pentaethylenehexamine, triethanolamine, and the like, or any mixtures thereof. When organoamino compounds are used in fluids of the invention, they are incorporated at an amount from about 0.01 wt % to about 2.0 wt % based on total liquid phase weight. Preferably, when used, the organoamino compound is incorporated at an amount from about 0.05 wt % to about 1.0 wt % based on total liquid phase weight. A particularly useful organoamino compound is tetraethylenepentamine, particularly when used with diutan viscosifying agent at temperatures of approximately 149° C. (300° F.).

Breakers may optionally be used in some embodiments of the invention. The purpose of this component is to “break” or diminish the viscosity of the fluid so that this fluid is even more easily recovered from the formation during cleanup. With regard to breaking down viscosity, oxidizers, enzymes, or acids may be used. Breakers reduce the polymer’s molecular weight by the action of an acid, an oxidizer, an enzyme, or some combination of these on the polymer itself. In the case of borate-crosslinked gels, increasing the pH and therefore increasing the effective concentration of the active crosslinker (the borate anion), will allow the polymer to be crosslinked. Lowering the pH can just as easily eliminate the borate/polymer bonds. At pH values at or above 8, the borate ion exists and is available to crosslink and cause gelling. At lower pH, the borate is tied up by hydrogen and is not available for crosslinking, thus gelation caused by borate ion is reversible. Preferred breakers include about 0.001 weight percent to about 0.24 weight percent conventional oxidizers such as ammonium persulfates, live or encapsulated, or potassium periodate, calcium peroxide, chlorites, and the like. In oil producing formations the film may be at least partially broken when contacted with formation fluids (oil), which may help de-stabilize the film. The breaker can be delayed, in one embodiment, and the delay can at least in part be facilitated where the breaker or breaker activator is concentrated or otherwise reactively separated in the partitioning agent-rich phase.

A fiber component may be included in the fluids used in the invention to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON™ polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be included at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Embodiments of the invention may use other additives and chemicals that are known to be commonly used in oilfield applications by those skilled in the art. These include, but are not necessarily limited to, materials in addition to those mentioned hereinabove, such as breaker aids, oxygen scavengers, alcohols, scale inhibitors, corrosion inhibitors, fluid-loss additives, bactericides, iron control agents, organic solvents, and the like. Also, they may include a co-surfactant to optimize viscosity or to minimize the formation of stabilized emulsions that contain components of crude oil, or as described hereinabove, a polysaccharide or chemically modified polysaccharide, natural polymers and derivatives of natural polymers, such as cellulose, derivatized cellulose, guar gum, derivatized guar gum, or biopolymers such as xanthan, diutan, and scleroglucan, synthetic polymers such as polyacrylamides and polyacrylamide copolymers, oxidizers such as persulfates, peroxides, bromates, chlorates, chlorites, periodates, and the like. Some examples of organic solvents include ethylene glycol monobutyl ether, isopropyl alcohol, methanol, glycerol, ethylene glycol, mineral oil, mineral oil without substantial aromatic content, and the like.

Embodiments of the invention may also include placing proppant particles that are substantially insoluble in the fluids. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and will preferably be in the range of from about 0.05 to about 3 kilograms of proppant added per liter of liquid phase. Also, any of the proppant particles can further be coated with a resin to potentially improve the strength, clustering ability, and flow back properties of the proppant.

Conventional propped hydraulic fracturing techniques, with appropriate adjustments if necessary, as will be apparent to those skilled in the art, are used in some methods of the invention. One preferred fracture stimulation treatment according to the present invention typically begins with a conventional pad stage to generate the fracture, followed by a sequence of stages in which a viscous carrier fluid transports proppant into the fracture as the fracture is propagated. Typically, in this sequence of stages the amount of propping agent is increased, normally stepwise. The pad and carrier fluid can be a fluid of adequate viscosity. The pad and carrier fluids may contain various additives. Non-limiting examples are fluid loss additives, crosslinking agents, clay control agents, breakers, iron control agents, and the like, provided that the additives do not affect the stability or action of the fluid.

Embodiments of the invention may use other additives and chemicals that are known to be commonly used in oilfield applications by those skilled in the art. These include, but are not necessarily limited to, materials in addition to those mentioned hereinabove, such as breaker aids, oxygen scavengers, alcohols, scale inhibitors, corrosion inhibitors, fluid-loss additives, bactericides, iron control agents, organic solvents, and the like. Also, they may include a co-surfactant to optimize viscosity or to minimize the formation of stabilized emulsions that contain components of crude oil, or as described hereinabove, a polysaccharide or chemically modified polysaccharide, natural polymers and derivatives of natural polymers, such as cellulose, derivatized cellulose, guar gum, derivatized guar gum, or biopolymers such as xanthan, diutan, and scleroglucan, synthetic polymers such as polyacrylamides and polyacrylamide copolymers, oxidizers such as persulfates, peroxides, bromates, chlorates, chlorites, periodates, and the like. Some examples of organic solvents include ethylene glycol monobutyl ether, isopropyl alcohol, methanol, glycerol, ethylene glycol, mineral oil, mineral oil without substantial aromatic content, and the like.

EXAMPLES

The following examples are presented to illustrate the preparation and properties of fluid systems, and should not be construed to limit the scope of the invention, unless otherwise expressly indicated in the appended claims. All percentages, concentrations, ratios, parts, etc. are by weight unless otherwise noted or apparent from the context of their use.

Example 1

Creation of crosslinked guar microspheres as dissolvable fluid loss additives. To create crosslinked guar microspheres, a two-phase aqueous polymer solution was created containing 2 wt % guar gum and 4 wt % polyethylene glycol (8000 molecular weight) in DI water. Both polymers were added to the water simultaneously while stirring moderately in a WARING BLENDER™. The polymers were continuously stirred for an hour to create a hydrated but phase separating bi-polymer solution. Under shear, the polymer solution consists of guar droplets dispersed in a continuous PEG solution.

The solution was sheared in this condition while the pH was brought up to approximately 10, and buffered to this condition by the addition of sodium sesquicarbonate. Then, a borate crosslinker solution (in DI water) was added to the sheared polymer blend.

After shearing for an additional two minutes, the blender was turned off and the contents of the polymer solution were examined. Instead of having a liquid guar phase mixed in the PEG solution, the guar polymer was seen to now be in the form of small "microbeads" of crosslinked guar. A picture of the microbeads examined under a microscope was analyzed to determine the diameter and properties of the microbeads.

Bead sizes measured by light scattering on a MALVERN MASTERSIZER™ have a mean "diameter" of approximately 100 microns. The beads were observed to remain stable in water at room temperature as long as the pH was buffered to pH 10. Dropping the pH by addition of glycolic acid to approximately pH 3, however, resulted in visible dissolution of the beads. Presumably the low pH environment reverses the borate crosslink on the guar polymer molecules, allowing the guar to dissolve in the water. Based on the known pH sensitivity of borate crosslinked guar, the beads can be expected to be stable at pH greater than about 8, but not below.

The crosslinked beads were then tested to verify that they can serve as useful fluid loss agents. FIG. 1 shows a typical data set from the fluid loss testing. In this test, the crosslinked guar beads have been added to a 5% KCl brine buffered to pH 10, but with no additional viscosifier. The beads have been added at a 1% concentration by mass of beads to volume of brine. 180 mL of the brine-bead suspension was placed in a static fluid loss cell and pushed with a differential pressure of approximately 500 psi through a one inch diameter sandstone core with a permeability of approximately 81 mD. (The core is one inch long). As shown in FIG. 1, after an initial spurt of approximately 6 mL of fluid through the core, the beads severely retard further fluid loss. After the initial spurt, only 2.2 mL of additional brine was leaked off over a 30 minute test. Upon completion of the test, the core was removed and examined. A thick filter cake of polymer was clearly visible on top of the core. It should be emphasized that the fluid loss control demonstrated in FIG. 1 was achieved in brine without any additional viscosifier added to the fluid.

Example 2

Crosslinked polymer beads with solid acid particles inside. In a second example of making crosslinked polymer beads from guar, the beads of example 1 have been reproduced, but this time with 8 micron particles of polyglycolic acid embedded within the beads. The process is the same as in example 1, but 0.5% by weight of the PGA particles are added to the guar-PEG water-in-water emulsion before the borate crosslinker is added.

Care must be taken to assure that the pH remains above 8 during the addition process, as any free glycolic acid must be neutralized when the PGA is added to the mixture. In the example, this was achieved by use of a pH buffer, sodium sesquicarbonate. A picture of the beads embedded with solid acid particles photographed on a microscope slide was taken. The PGA beads are visible as dark spots within the otherwise clear guar beads. The 8 micron PGA particles fit easily in the larger guar beads, and the mean bead size (as measured on the Mastersizer) is still approximately 100 microns.

The crosslinked guar microbeads do dissolve in water or linear gel if the pH is below about pH 8. In this way, the microbeads not only dissolve, but also serve as a means to release crosslinker. They can be used, therefore, as an additive for delayed crosslinking of polymeric fluids For a reversible crosslinker like a borate ion, the beads come apart if the pH is outside the range at which the crosslinker is effective. In the case of a borate ion, this is a pH below about pH 8.

Example 3

Crosslinked polymer beads. The previous examples have focused on crosslinked polymeric microbeads made from guar crosslinked with borate. To demonstrate that the approach of phase separating a polymer in a water-water emulsion has broader application for crosslinking microbeads, this example was created by phase separating sodium alginate (an anionic polysaccharide) with polyethylene glycol and then crosslinking the alginate beads with calcium.

Sodium alginate was phase separated as the internal droplet phase of an aqueous solution by adding 0.5% sodium alginate, 10% KCl and 6% PEG 8000 into 100 ml of DI water in a WARING BLENDER™. After dispersing the polymers and allowing the mixture to stir for a minimum of 30 minutes, 0.3% CaCl2 was added to crosslink the alginate beads. Upon stopping the blender and measuring the size of the beads on the MASTERSIZER™, they were found to have a broad particle size distribution with most of the particles having characteristics sizes between 10 microns and 100 microns with the mean particle diameter being approximately 35 microns.

These beads were visually seen to be dissolvable in clean water when chelant (sodium EDTA) was added to chelate the calcium crosslinker.

Example 4

Creating and using dried microbeads created from an aqueous biphasic solution. The objective of this example was to make guar-coated microbeads containing polyglycolic acid (PGA) particles and to then evaluate these beads as degradable fluid loss additives.

Process for making the guar-coated PGA beads:

1 gram of dry guar was dissolved in 100 ml DI water

Mixture was stirred to allow the guar to completely dissolve and hydrate 1 gram of PGA (8 micron size) were added to the hydrated guar 4 grams of polyethylene glycol (8000 Mw) was added to the viscous guar solution to induce phase separation 1 gram of buffer (sodium sesquicarbonate) was added to the two-phase guar-PEG mixture to bring the pH at approximately 10.

3 ml of a boric acid solution (comprising 3.5 g in 100 ml water) were added to the two phase mixture to crosslink the phase separated guar-rich regions in solution.

The idea of this process was to first coat PGA particles with guar and to then phase separate the guar from PEG in solution. The separated guar-rich phase was dried in an oven at 49° C. and then ground into a powder. The ground sample was sieved using 180 micron mesh. The order of addition in the above example is not meant to be restrictive. Beads can potentially also be made by crosslinking the polymer first and then phase separating with PEG or another phase-separating chemical.

Figure 2:
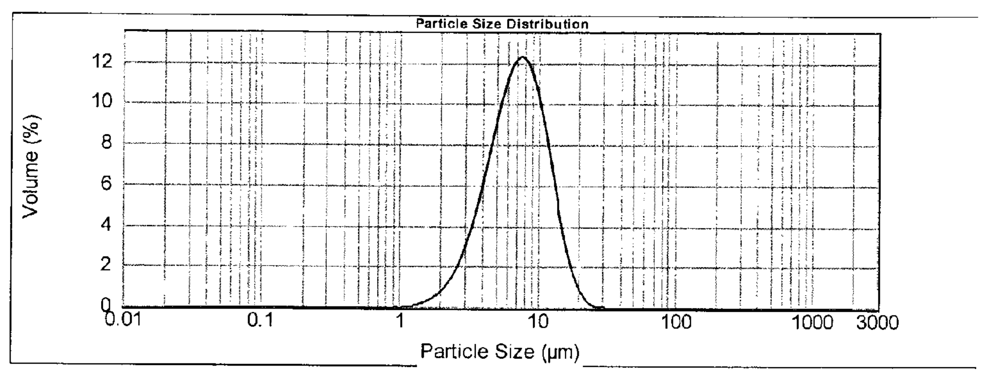
FIG. 2 is a particle size distribution plot of PGA particles before a coating is applied of an embodiment of the invention.
Figure 3:
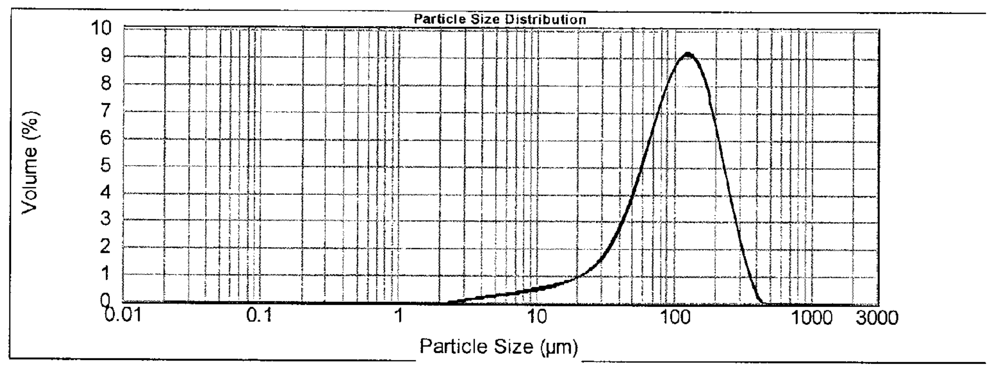
FIG. 3 is a particle size distribution plot of PGA particles after a coating is applied in an embodiment of the invention.

Particle size distributions were measured for both unaltered PGA and PGA/guar microbeads. Measurements were performed with a MALVERN MASTERSIZER™. FIG. 2 shows the measured size distribution of PGA particles before coating with guar in solution to make a microbead. The unaltered PGA particles have a mean particle size of approximately 8 microns. FIG. 3 illustrates the measured particle size distribution of the dried, ground microbeads containing both PGA and guar that is crosslinked with borate. The resulting powder has been sieved through a 180 micron screen. These particles show no significant particle distribution near 8 microns, but have a mean particle size one order of magnitude larger, that is, greater than 100 microns. The particle size analysis suggests that the particles created are, in fact, agglomerates of guar and PGA.

Fluid loss measurements were performed to evaluate the effectiveness of the dried beads as fluid loss control when introduced into a well service fluid. A static fluid loss test was performed on filter paper at 100 psi pressure differential using a base fluid of crosslinked guar. Fluid formulations were as follows:

0.2 weight percent guar 2 volume percent clay stabilizer (tetra methyl ammonium chloride, 50% solution)

Either no fluid loss additive or 1 wt % PGA or 1 wt % guar-coated PGA 2.5 volume percent 85:15 blend crosslinker package (sodium tetraborate decahydrate and glycerol crosslinker: sodium hydroxide, 30% aqueous)

In each test the crosslinker was added last and the fluid loss test was performed immediately thereafter.

Three fluid loss tests were performed. In the first, fluid loss for the base fluid alone was measured. In the second, the base fluid with 1 wt % PGA was measured. The third test measured fluid loss with 1 wt % guar-coated PGA beads. In each test initial fluid loss was performed at 29° C. followed by an increase in cell temperature to 79° C., followed by a shut-in period (temperature maintained at 79° C., but differential pressure removed).

Figure 4:
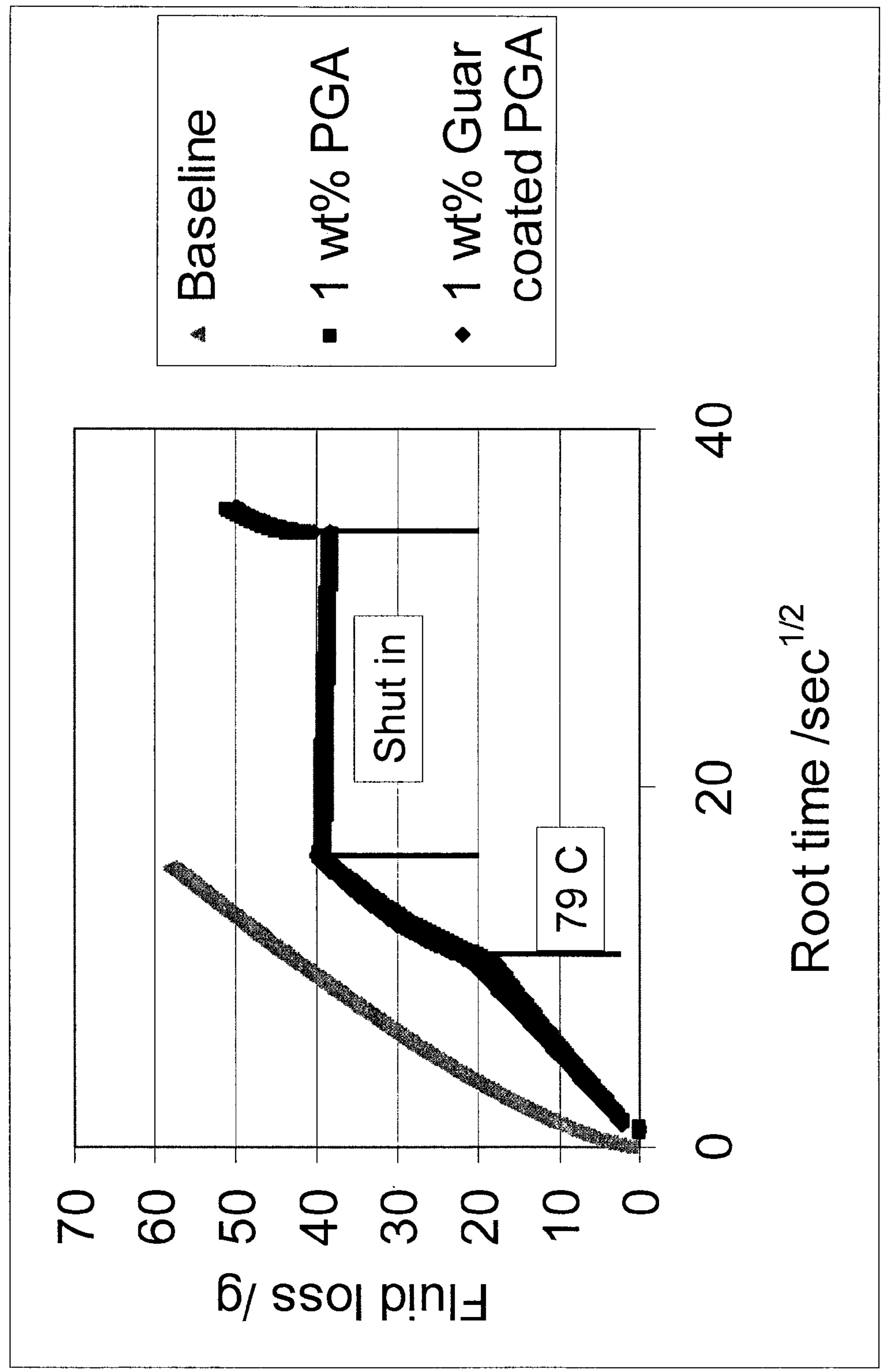
FIG. 4 is a plot of fluid loss as a function of root time per second of an embodiment of the invention.

FIG. 4 presents the results for the three fluid loss tests and compares the effect of guar-coated PGA and uncoated PGA on fluid loss compared with base fluid of crosslinked guar. Differential DP of 100 psi is applied before and after shut-in period. The left most curve is the base fluid without any fluid loss additive being tested at room temperature with DP=100 psi. The other two curves are of the base fluid with different fluid loss additives (added at 1 wt %) tested with changing conditions of temperature and DP. A 50% reduction in fluid loss is obtained at room temperature with the addition of either uncoated PGA or guar-coated PGA. Increase in temperature to 79° C. increases the fluid loss with further increase seen after the shut-in period (when differential pressure is again restored). Both uncoated and coated PGA provide significant fluid loss benefit compared to the base fluid, but coated PGA provides a significant cost reduction since much of the 1 weight percent additive is made up of a significantly less expensive ingredient.

The filtercake of the base fluid with the uncoated and coated PGA is different. The coated PGA gives a much thicker cake compared with the uncoated PGA even though the fluid loss is similar.

Figure 5:
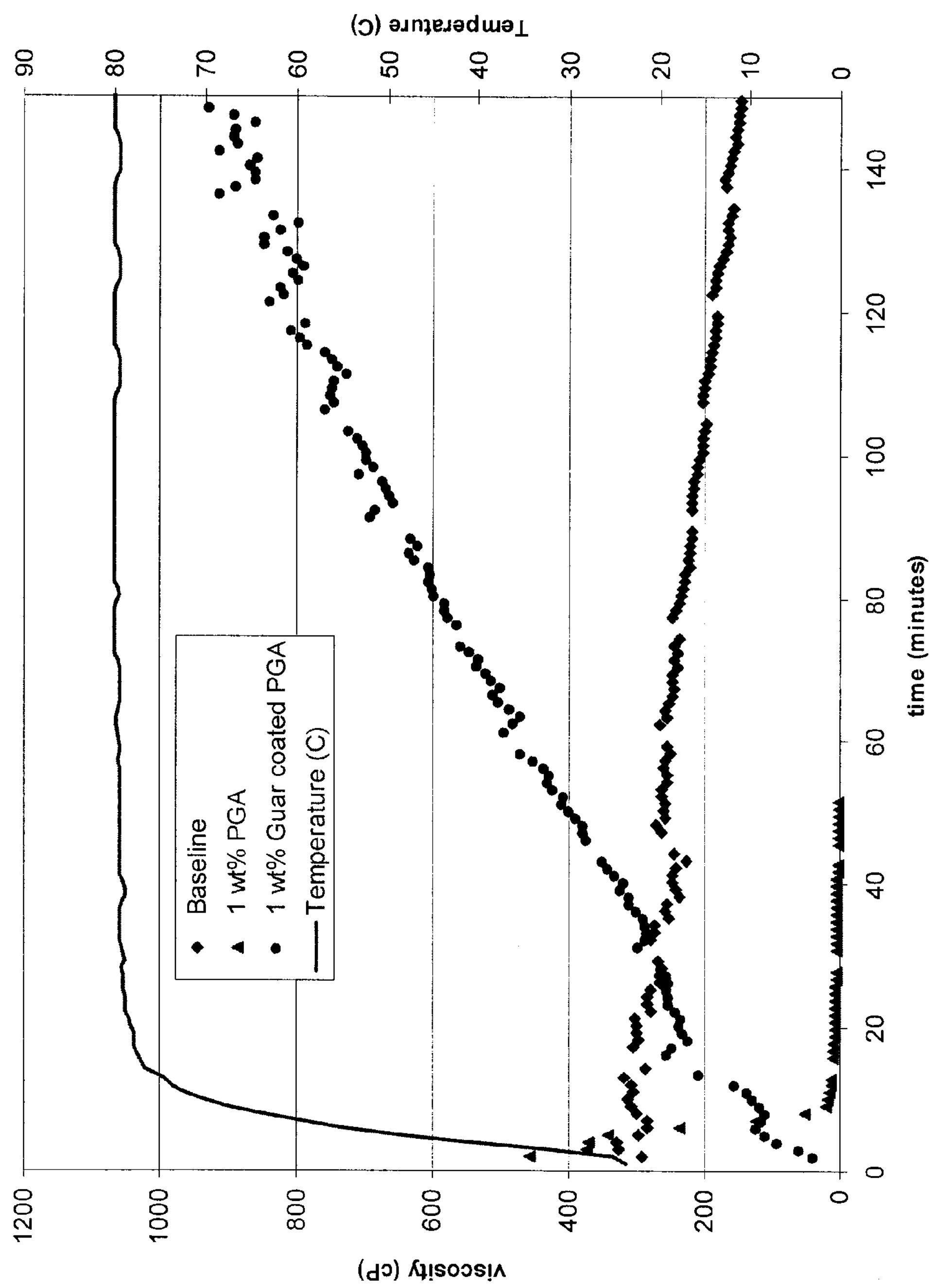
FIG. 5 is a plot of viscosity and temperature as a function of time for an embodiment of the invention.

The viscosity of the base fluid, base fluid containing 1 weight percent PGA and 1 weight percent guar coated PGA was measured at 79° C. using Grace rheometer and is shown in FIG. 5. The viscosity decreases with uncoated PGA presumably due to the hydrolysis of PGA generating acid that uncrosslinks guar. In the case of the guar-coated PGA the viscosity increases continuously due to the continuous hydration of guar. This example demonstrates that the dry beads can serve as an effective means of polymer delivery and controlled polymer release into a fluid formulation.

Example 5

Creation and stability of crosslinked polymer beads without addition of degradable acid particles. In this example, an aqueous mixture of 2 wt % guar and 4 wt % polyvinyl pyrollidone was stirred as a phase separating mixture while crosslinking the guar phase with boric acid at pH 10. (The pH buffer and crosslinker package are the same as the previous example.) Note that this example demonstrates that PEG is not the only phase-separating agent that can be useful in this process.

After being dried out overnight at 49° C., the polymer beads were ground to a fine powder and tested to see if they could last for a period of time in water without re-dissolving. A measured mass of 1 gram of beads was added to 100 ml of water with 2% KCl and a small amount of sodium sesquicarbonate to buffer the solution pH to approximately 10. Measurements of the bead size distribution as a function of time were made with a MALVERN MASTERSIZER™ and are shown in FIG. 6.

Figure 6:
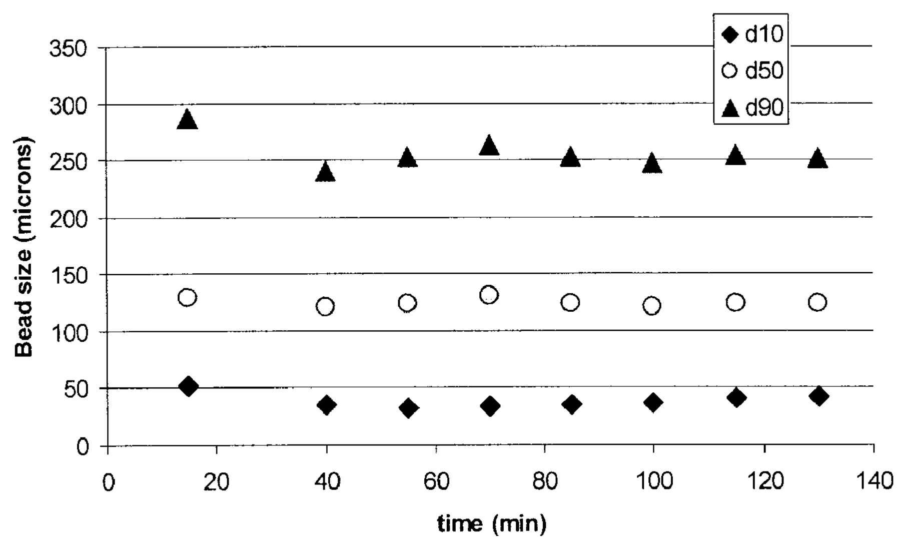
FIG. 6 is a plot of bead size as a function of time for an embodiment of the invention.

FIG. 6 plots bead size as a function of time for initially dry guar/PVP beads immersed in 2% KCl brine at pH 10 at room temperature and shows that at this condition the polymer beads remain intact with very little change in size distribution for a period of more than two hours. This suggests that such beads can be useful for fluid loss control or other downhole applications in wellbore fluids.

Advantages

The encapsulation of particles with guar and the formation of beads appear to have some distinct advantages both in terms of speed for forming a fluid at a well site and for fluid loss and rheology. This behavior is desired in various applications e.g. to form strong gels in the matrix, set plugs, low viscosity carrier fluid that gels up with time, etc. The gel may also be broken with time by the presence of a degradable particulate solid acid additive. Improved well clean-up may also be possible.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of forming a fluid for use within in a subterranean formation, comprising:

crossliniking a polymer along the surface of microspheres in a water-in-water emulsion; and introducing the microspheres into the subterranean formation.

2. The method of claim 1, further comprising performing the crossliniking and introducing continuously without isolating the microspheres from the water-in-water emulsion.

3. The method of claim 1, wherein the crosslinking occurs in the presence of a crosslinker.

4. The method of claim 3, wherein the crosslinker is borate, zirconate, or titanate.

5. The method of claim 1, wherein the polymer is guar, hydropropyl guar (HPG), carboxymethyl guar (CMG), carboxymethylhydroxypropyl guar (CMHPG), hydroxyethylcellulose (HEC), hydroxypropylcellulose (HPC), carboxymethylhydroxyethylcellulose (CMHEC), xanthan, diutan, scleroglucan, polyacrylamide, polyvinyl alcohol, polyethylene glycol, polypropylene glycol, polyacrylate polymers or combinations thereof.

6. The method of claim 1, wherein water-in-water emulsion comprises a weight ratio of the polymer to a partitioning agent from 1:4 to 5:1.

7. A method of forming a fluid for use within in a subterranean formation, comprising:

crossliniking a polymer along the surface of microspheres in a water in water emulsion;

isolating the microspheres from the emulsion; and introducing the microspheres into the subterranean formation.

8. The method of claim 7, farther comprising grinding the microspheres.

9. The method of claim 7, farther comprising spray drying the microspheres.

10. The method of claim 7, wherein the microspheres comprise solid acid particles, pH buffer, crosslinker, scale inhibitors, corrosion inhibitors, breakers, surfactants, clean up additives or a combination thereof.

11. The method of claim 7, wherein the microspheres comprise a crosslinikable polymer.

12. The method of claim 7, wherein the microspheres comprise a crossliniked polysaccharide polymer.

13. The method of claim 12, wherein the microspheres comprise alginate.

14. The method of claim 7, wherein the microspheres comprise a void wherein the void contains least one chemical agent.

15. The method of claim 14, wherein the microspheres release at least one chemical agent when the microspheres dissolve.

16. The method of claim 15 wherein the at least one chemical agent is a breaker.

17. The method of claim 7, farther comprising forming a filter cake along a boundary within the subterranean formation.

18. The method according to claim 17, wherein a filter cake is substantially destroyed when the microspheres dissolve.

19. A method for forming a fluid to treat a subterranean formation, comprising:

introducing a crosslinikable polymer, partitioning agent, and crossliniker into a solvent;

crosslinking the crosslinkable polymer;

isolating beads of the crosslinikable polymer from the partitioning agent; and introducing the beads into a fluid for treating a subterranean formation.

20. The method of claim 19, further comprising transporting the beads from a manufacturing or storage facility to the subterranean formation.

21. The method of claim 19, wherein the introducing the beads into a fluid maintains a crossliniked crosslinikable polymer.

22. The method of claim 19, wherein the introducing the crosslinikable polymer, partitioning agent, and crossliniker is performed at a pH to promote the crosslinikable polymer to crosslink and isolate from the partitioning agent.

23. The method of claim 22, wherein the pH is 8.0 or higher.

24. The method of claim 19, wherein the fluid is at a pH of 8.0 or higher.

25. The method of claim 19, wherein the fluid further comprises a solid acid particle, pH buffer, crossliniker, scale inhibitor, corrosion inhibitor, breaker, surfactants clean up additive or a combination thereof.

26. The method of claim 25, wherein the breaker releases an agent to lower the fluid pH to about 6.0 or lower.

27. The method of claim 26, wherein the beads deform upon exposure to the fluid with pH of about 6.0 or lower.

* * * * *